Jan. 2, 1968   W. R. CARROLL   3,361,272
LUMBER STACKER
Filed April 4, 1966   4 Sheets-Sheet 3
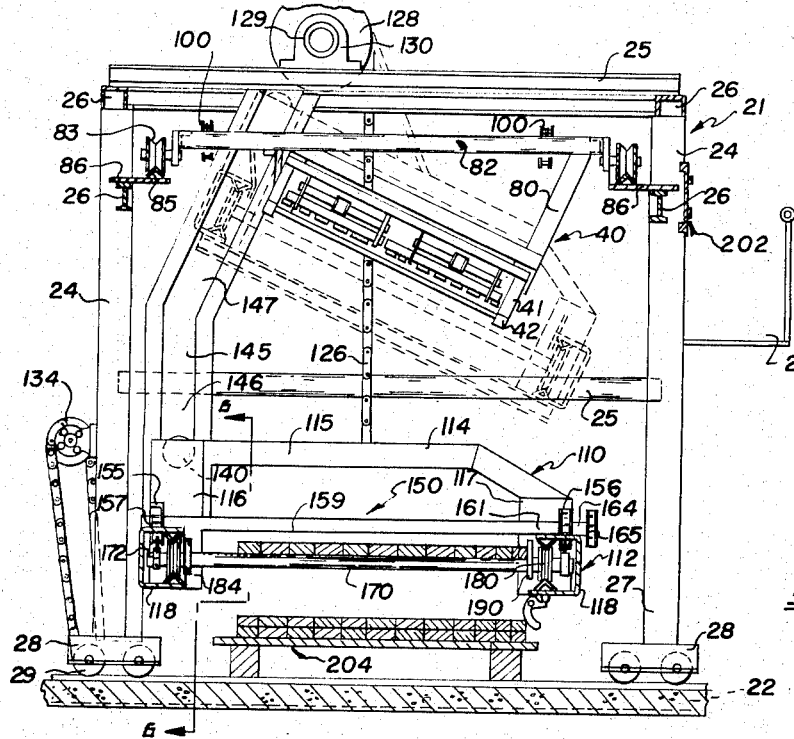
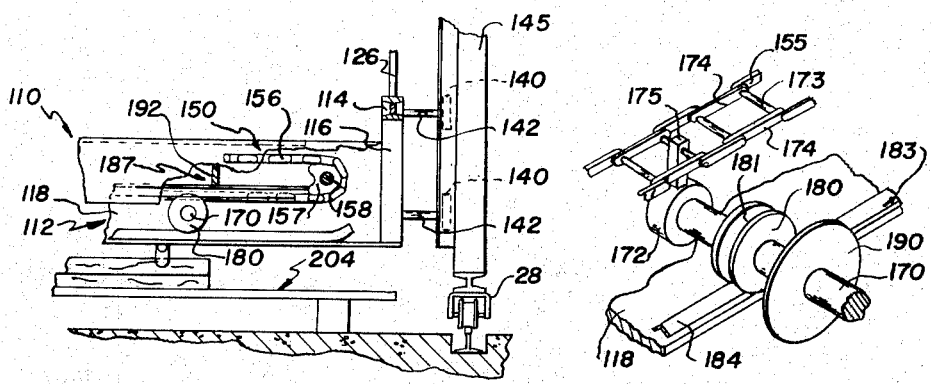
INVENTOR
WILLIAM R. CARROLL
BY
Fetherstonhaugh & Co.
ATTORNEYS Jan. 2, 1968   W. R. CARROLL   3,361,272
LUMBER STACKER
Filed April 4, 1966   4 Sheets-Sheet 4
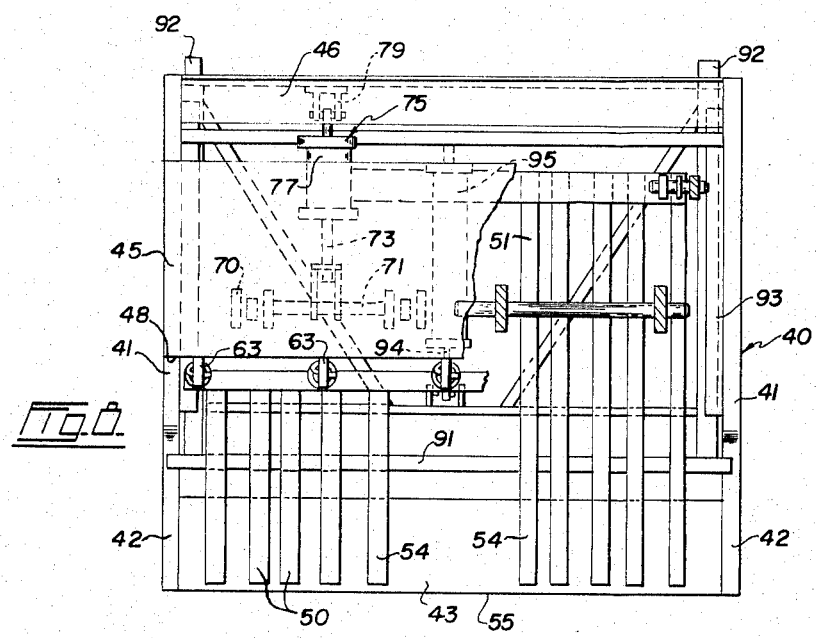
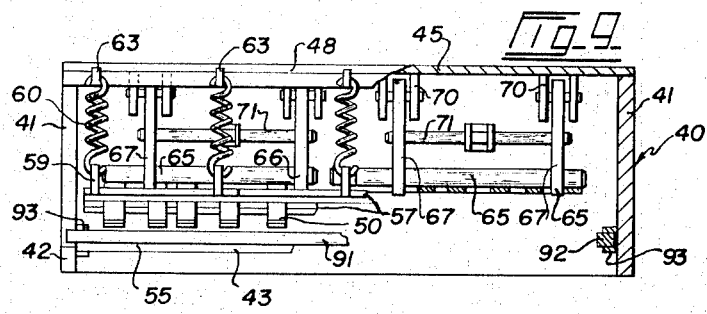
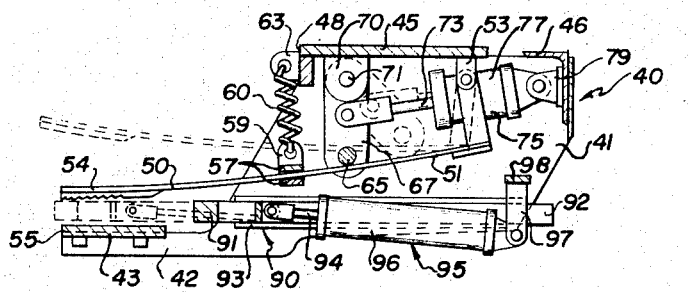
INVENTOR
WILLIAM R. CARROLL
BY
Fetherstonhaugh & Co.
ATTORNEYS

United States Patent Office 3,361,272
Patented Jan. 2, 1968

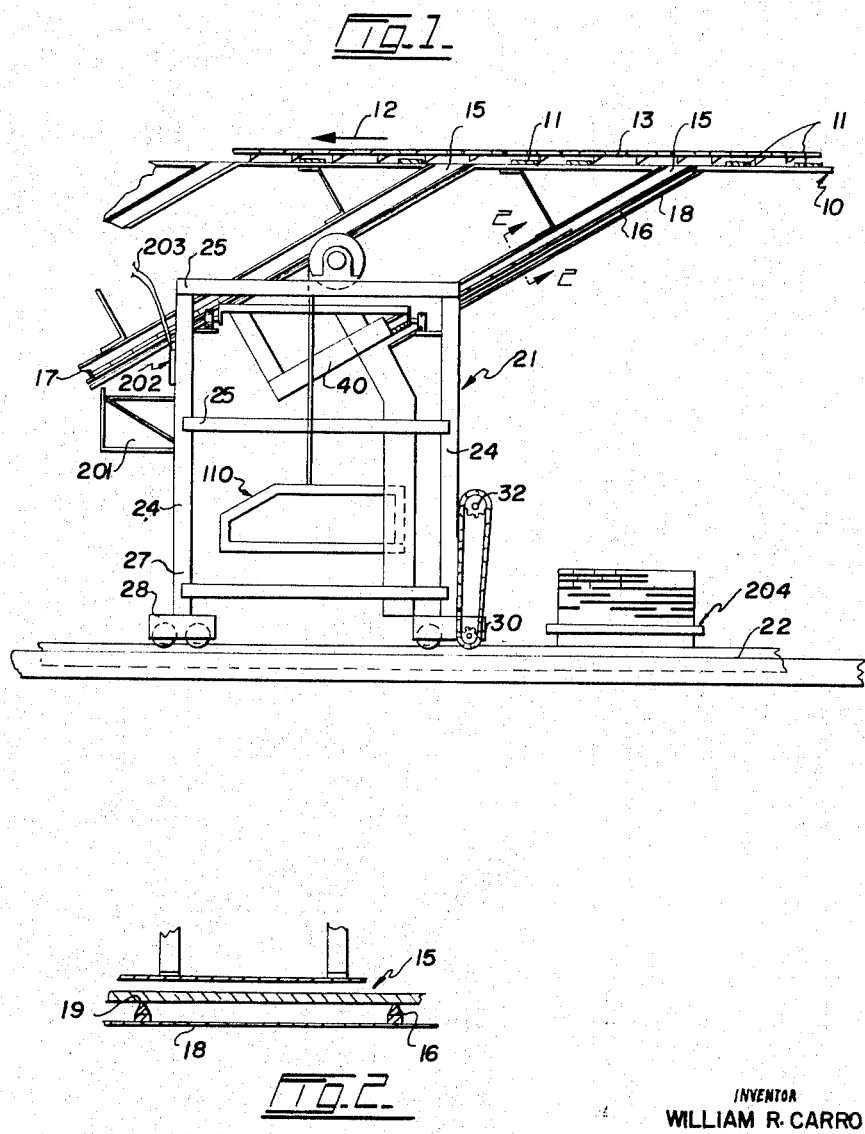

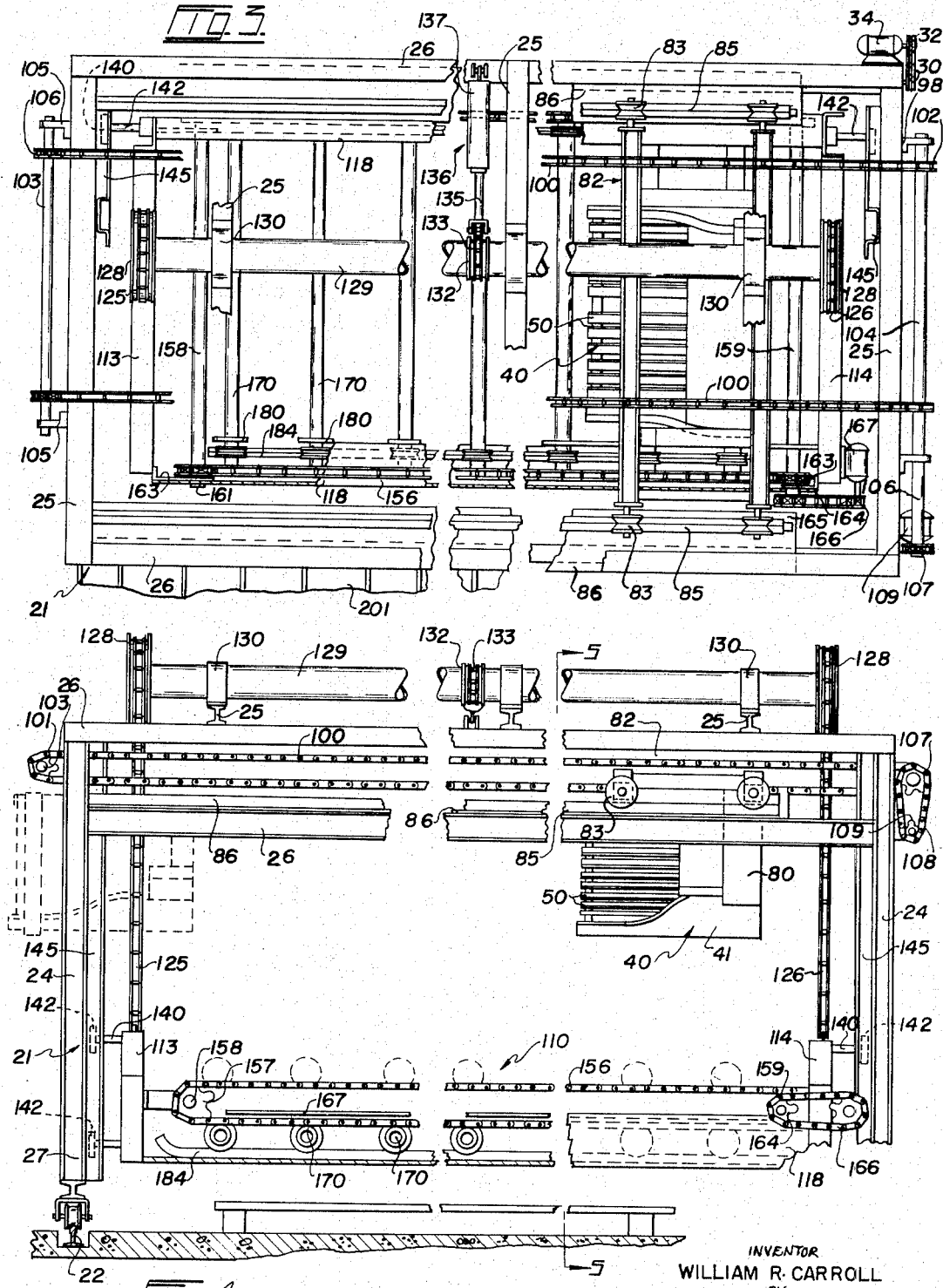

3,361,272
LUMBER STACKER
William R. Carroll, 1325 Mathers Ave.,
West Vancouver, British Columbia, Canada
Filed Apr. 4, 1966, Ser. No. 539,858
14 Claims. (Cl. 214—6)

This invention relates to apparatus for stacking individual pieces of lumber as they are delivered from a lumber sorter.

In the operation of a mill, individual pieces of lumber delivered from the planer or the like, are ordinarily of random length. Apparatus has heretofore been developed whereby the individual pieces of lumber, as they issue from the planer or the like, are carried over a sorting table whereby they are automatically sorted as to size and grade. The sorting apparatus used is usually an elongated table over which the lumber pieces are moved in a direction transversely to a length, said table being provided with a plurality of transversely extending openings normally closed by trap doors. Automatic operating means are provided whereby the trap doors may be operated to permit the lumber selected as to size or grade to fall through selected openings. The lumber is thereby separated, sorted and stored to facilitate the stacking thereof in separate piles for ease of transportation.

The stacking of the pieces of lumber into separate piles has often been carried out by hand, although it is appreciated that expensive and intricate equipment has heretofore been devised wherein stacking may be automatically accomplished.

The present invention provides an improved stacking apparatus which receives the individual pieces of lumber as they fall from the shorting table and arranges them into stacks of desired stack size for subsequent transfer.

The present invention furthermore provides an apparatus wherein stacking of the sorted pieces of lumber may be carried out quickly with absolute control thereof by an operator.

In accordance with the above, the present invention provides for a slide assembly at each station to receive the lumber dropped thereat and down which the lumber pieces slidably move by gravity to form a single layer, and further comprises a movable frame structure adapted to be positioned beside the slide assemblies, a lumber grab mounted on the frame for horizontal reciprocal movement away from and towards the slide assembly, said grab being operable to releasably grip the end of a layer of lumber and to draw the latter from the slide assembly, a vertically movable hoist on the frame structure below the gripping member operable between upper and lower limits, guide means on the frame structure engaged with the hoist arranged to position the latter in a horizontal position when at its lower limit and in an inclined position when at its upper limit, a lumber receiving platform assembly carried by the hoist, said platform assembly being reciprocally movable in a direction longitudinally of the length of the lumber pieces, an abutment member on the hoist against which the ends of the lumber in a layer are arranged to engage when the platform assembly is moved to permit the latter to be withdrawn from beneath said layer, and operator controlled powered means for operating the supporting structure, lumber gripping member, hoist and lumber receiving platform assembly.

In the drawings which illustrate the invention,

FIGURE 1 is a rear end view of the apparatus, the latter being shown substantially in schematic form, FIGURE 2 is a sectional view taken on line 2—2 of FIGURE 1, FIGURE 3 is a plan view of the apparatus with certain details omitted for the sake of clarity, FIGURE 4 is a side view of the apparatus, again with certain details omitted for the sake of clarity, FIGURE 5 is a sectional view of the apparatus taken on the line 5—5 of FIGURE 4, the hoist being shown in solid lines at its lower limit and in dotted lines at its upper limit, FIGURE 6 is a sectional view of a portion of the rear end of the apparatus taken along line 6—6 of FIGURE 5, FIGURE 7 is an isometric view of a portion of the lumber receiving platform, FIGURE 8 is a plan view, with portions omitted for the sake of clarity of the lumber gripping member, FIGURE 9 is an end view of the lumber gripping member as illustrated in FIGURE 8, and FIGURE 10 is an end view, partially in section, taken along line 10—10 of FIGURE 9, the lumber gripping member being shown in gripping position in solid lines and in open position in dotted lines.

Referring to the drawings and particularly to FIGURE 1 thereof, there is illustrated a table 10 of a lumber sorting device across which lumber pieces 11 are moved in a direction transversely of their length as shown by the arrow 12, by means of a lumber chain 13. The table 10 is provided with a plurality of transvesely extending slots 15 closeable by trap doors, not shown, over which the lumber pieces may be moved when the trap doors are in their closed position. Automatic grading apparatus, not shown, but which is standard in lumber mills now constructed, operate the trap doors in accordance with signals given whereby lumber pieces of predetermined grade or size may be dropped through selected openings, thereby sorting the lumber into the grade or size in accordance with the grading requirements. This form of sorting table is well known in the industry and forms no part of this invention.

Arranged below each of the openings 15, are a set of parallel inclined skids or slides 16, on to which each lumber piece moves and slides by gravity theredown until stopped by a stop 17 at the lower end of each of the skids or by a piece of lumber immediately therebelow, thereby forming a single layer of lumber on the skids. Each of these skids is of the same length and of the same inclination, and the stops 17 thereon are at the same elevation so that the lowermost piece of lumber on each set of skids will be at the same elevation.

The skids 16 are normally two in number supported by brace elements 18 connected to the table and, as shown in transverse cross section in FIGURE 2, are formed so that their upper edges 19 are almost knife edges so that a piece of lumber sliding down thereover in a direction transversely its length, will not deviate from its path or change its angular disposition relative to the skids.

A suporting frame 21 is arranged for movement beside the skids 16 on a pair of tracks 22, the latter being spaced apart a distance greater than the longest piece of lumber to be handled. The supporting frame 21 is formed of four upright leg members 24 maintained in an upright condition by transverse 25 and longitudinal 26 structural members so that a large open frame is formed. The lower ends 2 of the leg members 24 rest upon and are connected to wheel dollies 28 which rollably support the supporting frame on the tracks 22. One of the dolly wheels 29 is non-rotatably connected to a sprocket 30, the latter being chain-driven from a drive sprocket 32, said drive sprocket being operably engaged with an electric motor 34 mounted on the supporting frame 21.

Mounted for reciprocal movement within the supporting frame 21 and longitudinally thereof, is a lumber grab 40. This grab, as illustrated in FIGURES 3, 4, 5, 8, 9 and 10 comprises a pair of longitudinally elongated side members 41 between the forward ends 42 of which a flat transversely extending plate 43 is secured. Transversely extending brace plates 45 and 46 extend between these side members at their upper and rear edges respectively, being secured thereto, as by welding, so as to form a rigid frame, the brace plate 45 terminating at its forward edge 48 substantially half-way between the rear plate 46 and the plate 43. A plurality of elongated longitudinally extending spring fingers 50 are pivotally secured at their after ends 51 to brackets 53, the latter depending from upper brace plate 45, said spring fingers extending in side by side relationship with their forward ends 54 terminating at the forward edge 55 of the plate 43. These fingers are free to pivot in a vertical plane from a closed position in which the forward ends 54 are against the plate 43 as shown in solid lines in FIGURE 10 to an open position as shown in dotted lines in FIGURE 10.

These spring fingers 50 are sandwiched at their middle length between a pair of transversely extending members 57, the latter being provided with upstanding eye elements 59 to each of which an end of one of a plurality of tension springs 60 are connected, the other ends of the tension springs being connected to eye elements 63 secured at the forward end 48 of plate 45. These springs normally urge the spring fingers to pivotally move to an open position, as shown in dotted lines in FIGURE 10.

Mounted for swinging movement rearwardly of members 57, are a pair of transversely extending presser bars 65. Each presser bar is carried at the ends 66 of arms 67, the latter being pivotally hinged at their other ends between brackets 70 depending from plate 45. To cross bars 71 extending between paired arms 67 intermediately the ends of the latter, are secured pistons 73 of a pneumatic piston and cylinder assembly 75, the cylinders 77 of the latter being pivotally hinged on brackets 79 secured to plate 46. The piston and cylinder assembly is connected by pneumatic conduits, not shown, to a suitable source of air by means of which the piston 73 may be extended or retracted, the latter in its extended position swinging the arms 67 forwardly so as to move the presser bars 65 against the spring fingers, and moving the latter from their open position as shown in dotted lines against the action of the tension springs 60 to a closed position as shown in solid lines. Operation of the piston and cylinder assembly to retract the piston 73 will of course swing the presser bars 65 out of engagement with the spring fingers, permitting the tension springs 60 to move the latter to their open position.

The side members 41 of the lumber grab are each rigidly connected by means of inclined supporting pieces 80 to a trolley 82, the wheels 83 of which are rollably supported on longitudinally extending tracks 85 spaced apart at each side of the frame and supported on brackets 86 which are secured to the leg members 24.

The lumber grab 40 is supported in a transversely inclined position as illustrated in FIGURES 1 and 5, the inclination being the same as that of the skids 16 and so related in height thereto that when the side frame is properly located in front of any set of skids, the lower side of the plate 43 and lowermost spring finger when the latter is in its open position, will be aligned below and above respectively of the lowermost piece of lumber on the skid, said lowermost piece being the one next to the stops 17.

The lumber grab is also provided with an ejector 90. This ejector comprises a tranversely extending bar 91 having longitudinally extending guiding runners 92 at its ends mounted for longitudinal reciprocal movement between the side members 41, the latter having longitudinally extending ways 93 formed therein to slidably receive the runners 92. The bar 91 is connected intermediately of its ends to the piston 94 of a piston and cylinder assembly 95, the cylinder 96 thereof being pivotally secured to a bracket 97 carried on a transverse member 98 extending between said side members 41.

The cylinder 95 is connected by pneumatic conduits, not shown, to a suitable source of pressurized air fluid which may be controlled to extend or retract the piston 93, thereby moving the bar 91 over the plate 43, the amplitude of movement being illustrated in FIGURE 10 in which the bar 91 with the piston 94 retracted is shown in solid lines, and with the piston 94 extended is shown in dotted lines.

Extending longitudinally of the supporting frame 21 near the top thereof, are a pair of endless chains 100 passing over front sprockets 102, both pairs of sprockets 101 and 102 being carried on transversely extending shafts 103 and 104 respectively to which they are non-rotatably secured, the shafts being rotatably supported in brackets 105 which are secured to suitable transverse members 25 of the supporting frame. Shaft 104 is extended as at 106 and provided with a drive sprocket 107 which is chain-driven from a sprocket 108 operated by a hydraulic motor 109, the latter being connected, as hereinafter to be described, to a suitable source of electric power.

The chains 100 are each connected to the trolley 82, movement of the chains reciprocating the trolley between a retracted position as shown in solid lines in FIGURE 4 to an extended position as shown in dotted lines in the same figure, in which latter position the plate 43 and the forward ends of the spring fingers extend outwardly of the end of the supporting frame.

Mounted on the supporting frame is a hoist 110. This hoist has a longitudinally elongated bed 112, the bed having identical front 113 and rear 114 end sections. These end sections, the rear end section 114 being illustrated in frontal aspect in FIGURE 5, have an inverted U-shaped appearance having an upper base element 115 and side leg elements 116 and 117 respectively. The front and rear end sections 113 and 114 are connected by elongated longitudinally extending inwardly facing U-shaped channels 118. These channels extend between the lower ends of legs 116 and 117 respectively, and maintain the sections 113 and 114 in fixed spaced relationship. Transverse support bars 120 also extend between the lower ends of legs 116 and 117 on each of the sections so as to lend the entire frame rigidity.

The hoist is suspended from a pair of chains 125 and 126 respectively, chain 125 being secured to and centrally of the base 115 of front end section 113, and chain 126 being similarly secured to the base element 115 of rear end section 114. These chains extend vertically and each are carried over one of a pair of sprockets 128 non-rotatably secured at the ends of a longitudinally extending elongated shaft 129, the latter being mounted for rotation on bearing blocks 130 secured to the frame structure. This shaft 129 is provided with a drive sprocket 132 substantially at its middle length to which one end of a chain belt 133 is secured, the other end of the said belt 133 being secured to the end of a piston 135 of a piston and cylinder assembly 136, the cylinder 137 thereof being connected to a longitudinal member 26 of the supporting frame.

This cylinder 137 is connected by suitable conduits, not shown, to a suitable source of hydraulic fluid as hereinbefore mentioned, whereby the piston 135 may be extended or retracted to rotate the shaft 129 and with it the sprockets 128, thereby lifting or lowering the hoist.

The vertical legs 116 of the front and rear end sections 113 and 114 each carry a pair of vertically spaced wheels or rollers 140, these wheels or rollers being carried at the ends of stub shafts 142 which extend outwardly from said legs 116. These wheels or rollers are engaged in channel-shaped tracks 145 which are secured rigidly to the frame structure, said tracks 145 each having a lower vertical portion 146 and an upper inclined portion 147, the hoist when engaged with the portion 146 assuming a horizontal position as shown in solid lines in FIGURE 5, and when drawn upwardly into the upper portion 147 assuming an inclined position as shown in dotted lines in FIGURE 5, said inclined position corresponding to the inclined position of the lumber grab.

Hoist 110 serves as a carrier for a lumber receiving assembly 150. This assembly comprises a pair of endless chain belts 155 and 156 respectively which extend between sprockets 157 non-rotatably connected to and located adjacent the ends of transversely extending shafts 158 and 159, both of the latter being rotatably supported at their ends 161 by brackets 163 extending inwardly from both front and rear end sections 113 and 114 of the hoist. Shaft 159 has an extended portion 164 in which a drive sprocket 165 is non-rotatably secured, the latter being chain-driven as by an endless chain 166 from a hydraulic pump 167 suitably secured to the supporting framework, the hydraulic pump being driven by an electric motor 168 connected in a suitable manner by leads, not shown, to a source of electric power as hereinafter to be described.

The lower runs of each of the chain belts 155 and 156 each pass through from end to end one of the channel members 118, the upper legs 167 of the latter being partially removed at their ends adjacent the front and rear end sections 113 and 114 of the hoist, as illustrated in FIGURE 4 of the drawings, so as to provide a necessary opening for this purpose.

Between the chains are secured a plurality of transversely extending elongated rolls 170, each of the latter being rotatably journalled at its ends in bearings 172, said bearings each being connected to a chain. As illustrated in FIGURE 7, it is proposed to employ a chain having transverse pins 173 extending between connecting links 174, the bearing 172 swingably depending from one of the pins to which it is to be secured at the end of a connecting arm 175, the other end of the connecting arm being rotatably carried on said pins. Adjacent each of the bearings 172, there is journalled to each of the rolls 170, a guide roller 180. These guide rollers are arranged to pass through the channels 118 with the lower run of the chain belts 155 and 156, and these guide rollers each have re-entrant V-shaped peripheral edges 181 which rollably engage longitudinally extending V-shaped tracks 183 secured to the legs of the channel member 118, the lowermost of the tracks 184 serving to take the weight of the rolls 170 when the latter are located on the lower run of the chain belts 155 and 156, thereby maintaining said rolls in horizontal alignment.

Each of the rolls is also provided, adjacent the guide roll in the channel 118 secured to leg 117 of the sections 113 and 114, with an annular flange 190, these annular flanges, when viewed in the direction longitudinally of the hoist, being in longitudinal alignment.

Also secured to the hoist is a stop or abutment member 187. This stop is in the form of an elongated transversely extending horizontally disposed bar or rod 192 located between the upper and lower run of the chains 155 and 156 adjacent the rear end section of the hoist. This bar is rigidly secured at one end such as by welding to the channel member 118 connected to the legs 116 of said end sections. Its other end just clear the annular flanges 190 secured to the rolls and its lower edge lies just clear of the path of the rolls as they are moved through the channel members 118.

These rolls 170 are normally spaced approximately one or two feet apart and are grouped in series, the length of which is less than one-half the length of one of the chains so that all of the rolls may be located at one time between the channel members 118 and conversely located at one time on the upper run of the chain belts 155 and 156.

The operation of the lumber stacker is controlled by an operator who is stationed on a platform 201 suitably secured to the supporting frame and at which an operating console 202 is also located, said console being connected as by overhead main leads 203 to a main source of electrical power. The electric motor operating the hydraulic pump, supporting frame, lumber grab, and lumber receiving assembly are all operated through the console as is the electric motor driving the pneumatic piston and cylinder assemblies operating the spring fingers, ejector and hoist.

In the operation of the lumber stacker, the operator first positions the stacker properly in front of any set of skids from which a layer of lumber is to be taken, then raises the hoise 110 so that the base element 115 of the front end section 113 of the hoist is just above the spring fingers 50 of the lumber grab 40. The lumber grab 40 is then moved to its most extended position with the spring fingers 50 and plate 43 extending outwardly underneath said base element 115 towards the layer of lumber to be grabbed. The lumber grab is of course arranged in its open position and, when properly positioned, is then operated to grip the ends of the lumber pieces forming the lumber layer. The lumber grab is then retracted, drawing the layer of lumber from the skids and on to the rolls 170 of the lumber receiving assembly 150, said rolls 170 being arranged so that they extend along the lower run of the chain belts 155 and 156. When the lumber grab reaches its most retracted position, the spring fingers are operated to their open position and the lumber ejected from the plate 43 by the operation of the ejector 90. The layer of lumber now resting upon the rolls 170 will slide laterally with respect thereto until stopped by the annular flange 190. This operation may be continued if desired to position a plurality of layers, one upon the other, on the rolls 170. The hoist is then lowered until it reaches a horizontal position, and the chain belts operated so as to move the rolls 170 rearwardly from beneath the lumber layer thereon. Movement of the rolls will of course draw the ends of the pieces forming the lumber layer against the stop 187, thereby permitting the rolls to roll away from beneath said lumber layer and permit the lumber to be dropped therethrough, a pallet 204 being provided therebeneath to receive it.

The rolls 170 of the lumber receiving assembly which are at this point arranged along the upper run of the chain belts 155 and 156 are again positioned on the lower run thereof, and the operation of the stacker repeated to remove another layer or layers of lumber from the skids and deposit the same on the pallet. This operation is continued until the slide is nearly empty when the stacker is moved to another full slide. Ultimately, when a stack is completed, after several intermittent operations at any one slide, the completed stack is removed by a lumber carrier or other means. The completed stacks may of course be removed, together with the pallets by means of lumber carrier fork lift trucks or other suitable equipment.

It is to be appreciated that the lumber stacks may be used with the skids having any desired slope. Consequently, if the slope of the skids were 0°, the lumber grab 40 would be arranged in a horizontal position and the tracks 145 would extend vertically throughout their length so that the hoist 110 would also remain horizontally disposed throughout the length of its travel. It is to be understood, therefore, that the terms inclination or slope as applied to the attitude of the relevant portion of the apparatus shall be deemed to include inclination or slope of 0°.

It will be seen that the lumber stacker as hereinbefore described provides for continuous uninterrupted operation of the lumber sorter as the stacker may be moved beneath any one of the skids as a sufficient number of lumber pieces are deposited thereon to form a lumber layer of sufficient width to form stacks beneath each set of skids, said stacks being removed when they have been built up to the proper size.

What I claim as my invention is:

1. Lumber stacking apparatus for use in conjunction with a lumber sorter having lumber supporting stations at which the sorted lumber is delivered in side by side relationship in sorted single layers comprising a powered movable frame structure adapted to be positioned in confronting relationship with the end of any selected layer, a hoist mounted on the frame structure for movement in a vertical direction between an upper loading position and a lower unloading position, a lumber receiving platform movably mounted on the hoist for reciprocal movement towards and away from the confronted end of a layer to be stacked, a lumber grab movably mounted on the frame structure above the platform for reciprocal movement towards and away from said confronting end of said layer to be stacked for withdrawing the latter from its supporting station and on to the platform, means for moving the platform and with it the lumber layer deposited thereon in a direction away from said supporting station, and abutment means on the hoist arranged in the path of the layer and engageable therewith as the platform is moved to permit the latter to be moved from beneath the lumber layer supported thereon.

2. Lumber stacking apparatus as claimed in claim 1 in which the lumber grab comprises a frame, a transversely extending plate secured to the frame positioned, when the frame is moved to the layer to be stacked, to extend beneath the confronted end thereof, a plurality of elongated spring fingers pivotally mounted in the frame in longitudinally extending side by side relationship over the plate, and means for pivotally moving the fingers into and out of engagement with the plate.

3. Lumber stacking apparatus as claimed in claim 1 in which the platform comprises a pair of spaced parallel endless belts arranged for travel in a direction parallel to the length of the lumber in the layer, said belts having horizontal upper and lower runs, means for moving the belts in unison, and a series of elongated rolls extending between and rollably supported at their ends by the belts for movement therewith, said rolls being arranged in that the first and last rolls in the runs are spaced apart a distance substantially equal to one-half the total length of a belt, said belts being spaced apart a distance greater than the width of the layer of lumber to be stacked.

4. Lumber stacking apparatus as claimed in claim 3 including a pair of spaced horizontal and longitudinally extending tracks mounted on the hoist for rollably supporting the rolls when the latter are positioned to extend along the lower runs of the belts.

5. Lumber stacking apparatus as claimed in claim 1 including guides on the supporting frame for guiding the hoist throughout the limits of travel of the latter.

6. Lumber stacking apparatus for use in conjunction with a lumber sorter at which the sorted lumber is delivered in side by side relationship in sorted single layers comprising a set of tracks extending beside the layers to be stacked, said tracks being spaced apart a distance greater than the length of the lumber in said layers, a powered movable frame structure rollably connected on the tracks so as to be selectively located in confronting relationship with the end of any selected layer, a hoist mounted on the frame structure for movement in a vertical direction between an upper loading position and a lower unloading position, a lumber receiving platform movably mounted on the hoist for reciprocal movement towards and away from the confronted end of a layer to be stacked, a lumber grab movably mounted on the frame structure above the platform for reciprocal movement towards and away from said confronting end of said layer to be stacked for withdrawing the latter from its supporting station and on to the platform, means for moving the platform and with it the lumber layer deposited thereon in a direction away from said supporting station, and abutment means on the hoist arranged in the path of the layer and engageable therewith as the platform is moved to permit the latter to be moved from beneath the lumber layer supported thereon.

7. Lumber stacking apparatus as claimed in claim 6 in which the lumber grab comprises a frame, a transversely extending plate secured to the frame positioned, when the frame is moved to the layer to be stacked, to extend beneath the confronted end thereof, a plurality of elongated spring fingers pivotally mounted in the frame in longitudinally extending side by side relationship over the plate, and means for pivotally moving the fingers into and out of engagement with the plate.

8. Lumber stacking apparatus as claimed in claim 6 in which the platform comprises a pair of spaced parallel endless belts arranged for travel in a direction parallel to the length of the lumber in the layer, said belts having horizontal upper and lower runs, means for moving the belts in unison, and a series of elongated rolls extending between and rollably supported at their ends by the belts for movement therewith, said rolls being arranged in that the first and last rolls in the runs are spaced apart a distance substantially equal to one-half the total length of a belt, said belts being spaced apart a distance greater than the width of the layer of lumber to be stacked.

9. Lumber stacking apparatus as claimed in claim 8 including a pair of spaced horizontal and longitudinal extending tracks mounted on the hoist for rollably supporting the rolls when the latter are positioned to extend along the lower runs of the belts.

10. Lumber stacking apparatus as claimed in claim 6 including guides on the supporting frame for guiding the hoist throughout the limits of travel of the latter.

11. Lumber stacking apparatus for use in conjunction with a lumber sorter of the type in which pieces of lumber to be sorted are moved in a direction transversely of their length and dropped in graded order at selected stations in their lines of travel comprising a set of inclined slides at each station to receive the pieces of lumber, said slides being inclined from the horizontal sufficiently to permit the lumber pieces to slide downwardly thereover and form a single layer thereon, a powered movable frame structure adapted to be positioned in confronting relationship with the end of any selected layer, a hoist mounted on the frame structure for movement in a vertical direction between an upper loading and a lower unloading position, a set of guides on the supporting frame for slidably guiding the hoist during operation of the latter, said guides having inclined upper portions arranged to position the hoist and platform in an inclined position corresponding to the inclination of the slides when said hoist is in its loading position, a lumber receiving platform movably mounted on the hoist for reciprocal movement towards and away from the confronted end of a layer to be stacked, a lumber grab movably mounted on the frame structure above the platform for reciprocal movement towards and away from said confronting end of said layer to be stacked for withdrawing the latter from its slides and on to the platform, means for moving the platform and with it the lumber layer deposited thereon in a direction away from said slides, and abutment means on the hoist arranged in the path of the layer and engageable therewith as the platform is moved to permit the latter to be moved from beneath the lumber layer supported thereon.

12. Lumber stacking apparatus as claimed in claim 11 wherein the slides are provided with upper knife edge portions.

13. Lumber stacking apparatus as claimed in claim 11 in which the platform comprises a pair of spaced parallel endless belts arranged for travel in a direction parallel to the length of the lumber in the layer, said belts having horizontal upper and lower runs, means for moving the belts in unison, and a series of elongated rolls extending between and rollably supported at their ends by the belts for movement therewith, said rolls being arranged in that the first and last rolls in the runs are spaced apart a distance substantially equal to one-half the total length of a belt, said belts being spaced apart a distance greater than the width of the layer of lumber to be stacked.

14. Lumber stacking apparatus as claimed in claim 13 including annular flange elements on the rolls adjacent the lower ends thereof when the platform is in its inclined position slidably engageable with the lower side edge of the layer as the latter is drawn on to the rolls by the grab.

References Cited

UNITED STATES PATENTS

| 2,167,045 | 7/1939 | Hooper | 214—6 |
| 3,257,006 | 6/1966 | Kampert | 214—6 |

OTHER REFERENCES

German printed application, 1,108,145, May 1961.

GERALD M. FORLENZA, *Primary Examiner.*

R. J. SPAR, *Assistant Examiner.*